United States Patent [19]

Fauteux et al.

[11] Patent Number: 5,512,392
[45] Date of Patent: Apr. 30, 1996

[54] ELECTROLYTIC CELL USING SMALL PARTICLE GRAPHITE

[75] Inventors: Denis G. Fauteux, Acton; Jie Shi, Arlington, both of Mass.

[73] Assignee: Arthur D. Little, Inc., Cambridge, Mass.

[21] Appl. No.: 386,736

[22] Filed: Feb. 10, 1995

[51] Int. Cl.⁶ .................................................. H01M 10/36
[52] U.S. Cl. ........................................................... 429/218
[58] Field of Search .................................. 429/218, 209, 429/232, 194

[56] References Cited

U.S. PATENT DOCUMENTS 4,423,125 12/1983 Basy .................................... 429/218 X
5,069,683 12/1991 Fong et al. ......................... 429/218 X

FOREIGN PATENT DOCUMENTS 0600718 8/1994 European Pat. Off. .

Primary Examiner—Anthony Skapars
Attorney, Agent, or Firm—Dick and Harris

[57] ABSTRACT

An electrolytic cell using small particle graphite and an electrolytic process wherein the electrolytic cell includes an electrode constructed with a lithium source and another electrode constructed with relatively small graphite particles. The graphite particles possess physical attributes which serve to increase the reversible capacity of the graphite beyond the known theoretical capacity of 372 mAh/g of $LiC_6$.

12 Claims, 1 Drawing Sheet

ELECTROLYTIC CELL USING SMALL PARTICLE GRAPHITE

BACKGROUND OF THE INVENTION

1. Field of the Invention

The present invention relates in general to secondary electrolytic cells, and, more particularly, to rechargeable lithium cells having an electrode constructed with a graphite material.

2. Background Art

Rechargeable, or secondary lithium cells, have been known in the art for several years. Furthermore, lithium cells which utilize an electrode constructed with a carbon material have likewise been known in the art.

Although such carbon materials, and, in particular, graphite carbon materials, have proven to be beneficial in lithium cells —inasmuch as they provide long cycle life and high energy levels over other existing materials—they nonetheless have some known thereoretical limitations. For example, in an electrolytic cell having a lithium source electrode and an electrode constructed with graphite particles, the known thereoticle capacity of $LiC_6$ is 372 mAh/g. While testing has been done in the field to develop a carbon/graphite electrode for use in a lithium cell which will have a reversible capacity close to that for $LiC_6$, such testing has yet to achieve such a goal. (See, e.g. Development of a High Energy Density Rechargeable Lithium -Ion Cell Technology, authored by Walter Ebner, et al., of Rayovac Corporation, Madison, Wi., presented at the 36th Power Sources Conference in Cherry Hill, New Jersey Jun. 6–9, 1994).

Furthermore, while such testing and advancements in the prior art have resulted in the development of lithium cells having greater energy densities, and, in turn, greater run time, the reversible capacity of the cells, developed to date, typically decrease over several initial succeeding charge and discharge cycles until a relatively stabilized capacity has been obtained—again, at a reversible capacity well below 372 mAh/g. Accordingly, it is an object of the present invention to provide an electrolytic cell using small particle graphite wherein the reversible capacity of the graphite is substantially maintained well beyond 372 mAh/g after the initial charge and discharge cycle.

It is also an object of the present invention to provide an electrolytic cell using small particle graphite wherein the reversible capacity of the graphite continues to remain beyond 372 mAh/g after subsequent charge and discharge cycles.

It is still further an object of the present invention to provide an electrolytic cell using small particle graphite wherein the reversible capacity of the graphite is increased beyond the known theoreticle capacity of 372 mAh/g for $LiC_6$.

These and other objects of the present invention will become apparent in light of the present Specification, Claims and Drawings.

SUMMARY OF THE INVENTION

An electrolytic cell using small particle graphite and an associated electrolytic process wherein the cell comprises a first electrode constructed with a lithium source and a second electrode constructed with graphite. Means are associated with the graphite for increasing the reversible capacity of the graphite beyond the known theoretical capacity of 372 mAh/g for $LiC_6$. In addition, the cell also includes an electrolyte associated with the first and second electrodes.

In a preferred embodiment of the invention, the electrolytic cell further comprises a surface layer applied to at least one of the first and second electrodes. The surface layer includes means for enabling transfer of ions, from the electrode to which the surface layer is applied, to the electrolyte and back into contact with the electrode, and, for providing electronic conductivity in the surface layer to, in turn, result in a substantially uniform distribution of lithium metal ions back onto the electrode during electrodeposition. In such a preferred embodiment, the electrolytic cell may further include means for substantially obtaining chemical equilibrium between the surface layer and the electrode.

In another preferred embodiment of the invention, an electrolytic cell using small particle graphite comprises a first electrode constructed with a lithium source and a second electrode constructed with graphite. In addition, means are associated with the graphite for maintaining the reversible capacity of the graphite beyond 372 mAh/g, after an initial charge is applied to the electrolytic cell, and, in turn, after subsequent charge and discharge cycles to the electrolytic cell. Furthermore, an electrolyte is associated with the first and second electrodes.

Also in the preferred embodiment of the invention, an electrolytic process is disclosed for increasing the reversible capacity of graphite in an electrolytic cell having a first electrode constructed with a lithium source and a second electrode constructed with graphite particles, beyond the known theoretical capacity of 372 mAh/g for $LiC_6$. The electrolytic process comprises the steps of: a) applying an initial charge capacity greater than 372 mAh/g to the electrolytic cell; b) intercalating and/or reducing lithium ions at the second electrode upon charging; c) forming a passive layer around the graphite particles, at the second electrode, during the intercalation of the lithium ions; d) releasing the lithium ions from the second electrode through oxidation and/or deintercalation of the lithium ions from lithium carbon compounds; and e) obtaining a reversible capacity of greater than 372 mAh/g. The electrolytic process may further include the step of f) maintaining the reversible capacity of the graphite particles beyond 372 mAh/g during subsequent charge and discharge cycles of the electrolytic cell.

BEST MODE FOR PRACTICING THE INVENTION

Figure 1:
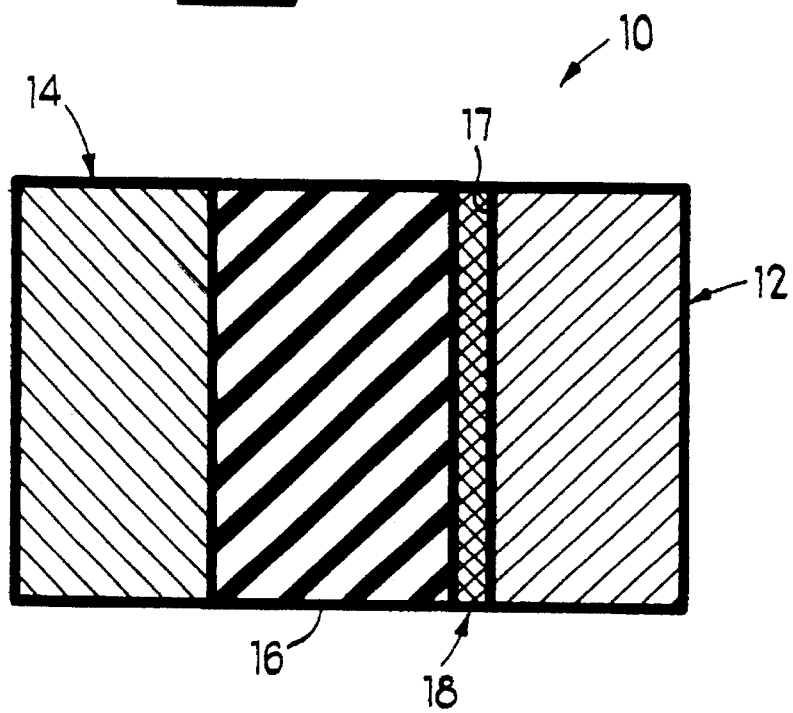
FIG. 1 of the drawings is a schematic representation of the present electrolytic cell using small particle graphite.

While this invention is susceptible of embodiment in many different forms, there is shown in the drawings and will herein be described in detail, one specific embodiment with the understanding that the present disclosure is to be considered as an exemplification of the principles of the invention and is not intended to limit the invention to the embodiment so illustrated.

Electrolytic cell 10 is shown in FIG. 1 as comprising first electrode 12, second electrode 14, electrolyte 16 and surface layer 18 which has been applied to interface 17 of first electrode 12. In a preferred embodiment, first electrode 12 comprises a lithium metal anode and second electrode 14 comprises a graphite cathode. However, as will be understood to those with ordinary skill in the art, it is contemplated that the anode be constructed with graphite and that the cathode be constructed with a lithium source. In addition, and as will be explained in greater detail, the structure of the graphite material comprises the means for increasing the capacity of the graphite beyond the known theoretical capacity of 372 mAh/g for $LiC_6$, as well as for maintaining the reversible capacity of the graphite beyond 372 mAh/g, after an initial charge is applied to electrolytic cell 10, and, in turn, after subsequent charge and discharge cycles thereto.

Figure 2:
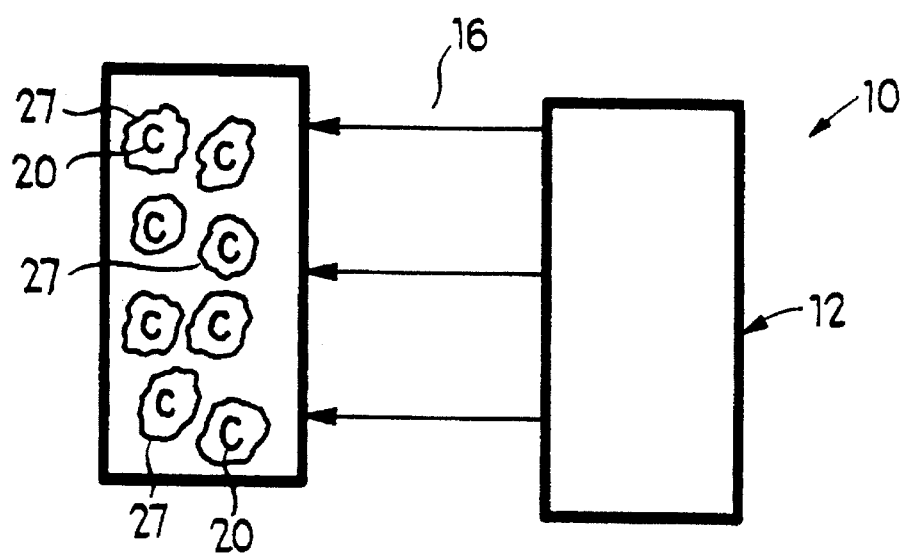
FIG. 2 of the drawings is a schematic representation of the present electrolytic cell using small particle graphite.

Surface layer 18 is shown in FIG. 2 as applied to interface 17 of lithium anode 12. Surface layer 18 includes means for: 1) enabling transfer of ions from anode 12 to electrolyte 16, and then back into contact with the anode; 2) providing electronic conductivity in surface layer 18; as well as 3) obtaining substantial chemical equilibrium between surface layer 18 and anode 12, to, in turn, result in a substantially uniform distribution of metal ions back onto anode 12 during electrodeposition—thereby substantially suppressing dendritic growth on the anode. In a preferred embodiment, surface layer 18 may comprise a copolymer of polyvinylnaphthalene and polyethylene oxide —although other materials which exhibit the above identified properties are likewise contemplated for use. Furthermore, although such a surface layer has been shown and described, it is contemplated that the electrolytic cell be constructed without the surface layer if so desired.

The electrolytic process is shown in FIG. 1 wherein, upon charging of electrolytic cell 10, lithium ions ($Li^+$) are permitted to pass from anode 12, toward and into electrolyte 16, and eventually onto cathode 14 where the lithium will intercalate with the graphite particles. In addition, during the initial charging of the cell, some of the electrolyte will decompose on the anode so as to form passivating layers 27 around each of the graphite particles. Although reference has been made with respect to the lithium "intercalating" with the graphite particles, it is also contemplated that the lithium undergo reduction with the graphite at relatively high capacities.

As will be explained below, graphite particles with various structural properties, resulted in significant increases of the reversible capacity of the graphite beyond the known theoreticle capacity of 372 mAh/g for $LiC_6$. Furthermore, after the initial charge was applied to the cell, the reversible capacity was actually maintained well above 372 mAh/g during subsequent charge and discharge cycles.

In support of the process, several experiments were conducted using graphite particle samples having various physical properties. In each of such experiments, conventionally available graphite particles (LONZA KS-6; LONZA KS-25; and LONZA KS-44) were dispersed on a Ni felt electrode having a surface area of 4.9 $cm^2$. The relevant physical properties of each of the graphite samples are shown in Table I hereinbelow:

Each of the graphite samples were pressed on a corresponding electrode at 40,000 lbs. of pressure. Specifically, the electrode tested with LONZA KS-6 was constructed with 8.3 mg of graphite (see Graph No.I hereinbelow), the electrode tested with LONZA KS-25 was constructed with 22.3 mg of graphite (see Graph No. II hereinbelow), and, the electrode tested with LONZA KS-44 was constructed with 21.9 mg of graphite (see Graph No. III hereinbelow).

A three electrode cell (a new cell was constructed for each of the graphite samples) was then constructed wherein the electrode with the pressed graphite served as the working electrode, and a counter electrode and a reference electrode were both constructed from lithium foil (each having an approximate thickness of 50 μ). The electrolyte used in each of the cells, and, in turn, in each of the experiments, comprised a liquid electrolyte composed of a 1 molal $LiPF_6$ solution of an ethylene carbonate and dimethyl carbonate mixture with a ratio of 3:2. However, it is contemplated that other types of electrolytes, whether liquid, polymeric or solid, can also be used if desired.

The fully constructed cells were then connected to a MACCOR cycler wherein the working electrode (graphite) was connected as positive (B+ and S+), the counter electrode was connected as negative (B-) and the reference electrode was connected as a voltage probe electrode (S-). The cells were then cycled under the following conditions:

1. Discharge current ($I_d$), which corresponds to lithium intercalation or reduction, and charge current ($I_c$), which corresponds to lithium de-intercalation or oxidation, were the same.

2. The discharge and charge voltage range was between 2.000–0.000 volts. After 0.000 volts was reached, the cell was allowed to rest for twenty minutes at its open circuit state. When 2.000 volts was reached, such voltage was maintained for twenty minutes.

EXPERIMENT NO. I

In this experiment, the working electrode of the cell tested was constructed with 8.3 mg of LONZA KS-6 graphite. The cell was subjected to the following conditions for each specific charge and discharge cycle:

$I_d$ and $I_c$ were both 0.564 mA for the first two complete cycles, wherein that amount of current represented approximately a C/5 discharge rate based on the theoretical $LiC_6$ capacity;

$I_d$ and $I_c$ were both 1.410 mA for the third full cycle, wherein that amount of current represented approximately a C/2 discharge rate based on the theoretical $LiC_6$ capacity; and $I_d$ and $I_c$ were both 2.820 mA for the fourth full cycle, wherein that amount of current represented approximately a C discharge rate based on the theoretical $LiC_6$ capacity.

TABLE 1

| GRAPHITE SAMPLE | MEAN VOL. DIAMETER (μm) | SURFACE AREA ($m^2/g$) | ACTIVE SURFACE AREA ($m^2/g$) | CRYSTALLINE HEIGHT (nm) |
|---|---|---|---|---|
| LONZA KS-6 | 3.34 | 22 | 0.44 | 65 |
| LONZA KS-25 | 10.5 | 13 | 0.09 | 90 |
| LONZA KS-44 | 20.25 | 10 | 0.04 | >100 |

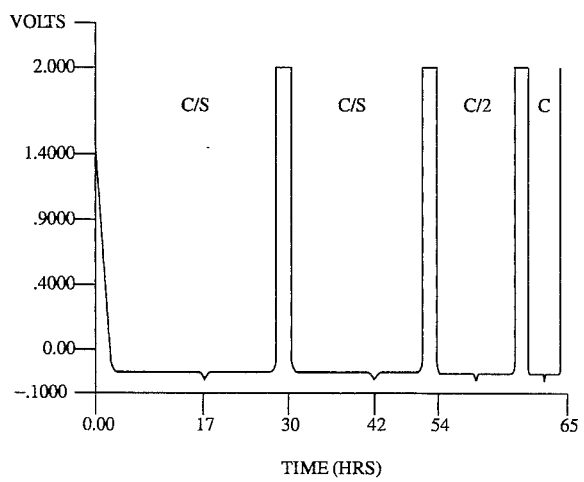

GRAPH NO. I

As represented in Graph No. I hereinabove, the first discharge capacity (intercalation or reduction), took approximately 17 hours, while the first charge capacity (de-intercalation or oxidation) took approximately 13 hours. Inasmuch as Specific Capacity=time of discharge ("intercalation")/g, it can easily be calculated that the Specific Capacity of the graphite in this tested cell was approximately 1150 mAh/g. Since the Reversible Capacity=time of charge ("de-intercalation")/g, it can further be determined that the Reversible Capacity of the graphite used in this tested cell to be approximately 880 mAh/g—well beyond the Known theoreticle capacity of 372 mAh/g for $LiC_6$. Accordingly, the Irreversible Capacity of approximately 270 mAh/g can likewise be calculated by subtracting the de-intercalation capacity (880 mAh/g) from the intercalation capacity (1150 mAh/g).

As can further be observed from Graph No. I, through the above-identified calculations, the Reversible Capacity of the tested graphite continued to remain well beyond the known theoretical capacity of 372 mAh/g for $LiC_6$ after subsequent discharge and charge cycles. In addition, such dramatic improvements were prevalent even when different currents were applied. (See, C/2 and C in Graph No. I).

EXPERIMENT NO. II

In this experiment, the working electrode of the cell tested was constructed with 22.3 mg of LONZA KS-25 graphite. The cell was subjected to the following conditions for each specific charge and discharge cycle:

$I_d$ and $I_c$ were both 0.758 mA for all cycles, wherein that amount of current represented approximately a C/10 discharge rate based on the theoretical $LiC_6$ capacity.

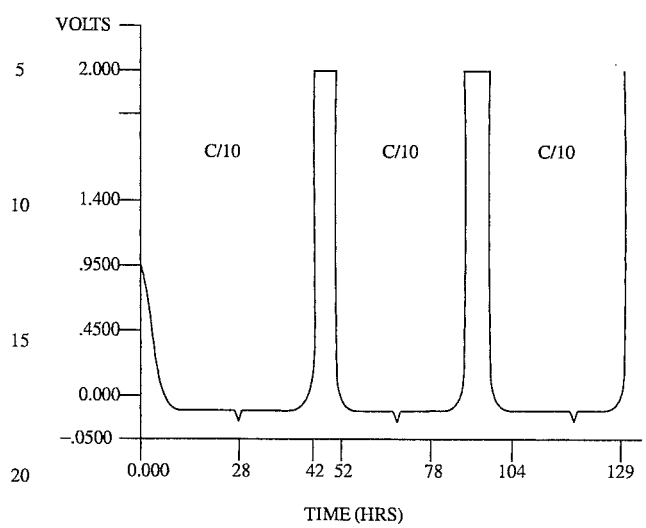

GRAPH NO. II

As represented in Graph No. II hereinabove, the first discharge capacity (intercalation or reduction), took approximately 28 hours, while the first charge capacity (de-intercalation or oxidation) took approximately 16 hours. Inasmuch as Specific Capacity=time of discharge ("intercalation")/g, it can easily be calculated that the Specific Capacity of the graphite in this tested cell was approximately 940 mAh/g. Since the Reversible Capacity=time of charge ("de-intercalation")/g, it can further be determined that the Reversible Capacity of the graphite used in this tested cell to be approximately 550 mAh/g—well beyond the Known theoreticle capacity of 372 mAh/g for $LiC_6$. Accordingly, the Irreversible Capacity of approximately 390 mAh/g can likewise be calculated by subtracting the de-intercalation capacity (550 mAh/g) from the intercalation capacity (940 mAh/g).

As can further be observed from Graph No. II, through the above-identified calculations, the Reversible Capacity of the tested graphite continued to remain well beyond the known theoretical capacity of 372 mAh/g for $LiC_6$ after subsequent discharge and charge cycles.

EXPERIMENT NO. III

In this experiment, the working electrode of the cell tested was constructed with 21.9 mg of LONZA KS-44 graphite. The cell was subjected to the following conditions for each specific charge and discharge cycle:

$I_d$ and $I_c$ were both 0.745 mA for all cycles, wherein that amount of current represented approximately a C/10 discharge rate based on the theoretical $LiC_s$ capacity.

GRAPH NO. III

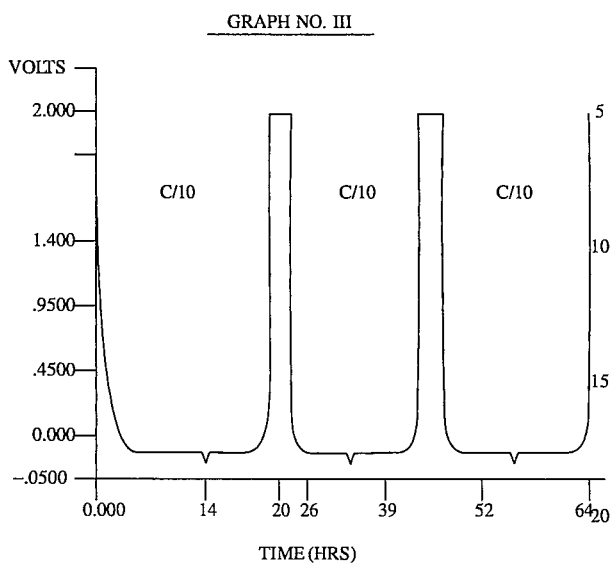

TIME (HRS)

As represented in Graph No. III hereinabove, the first discharge capacity (intercalation or reduction), took approximately 14 hours, while the first charge capacity (de-intercalation or oxidation) took approximately 7 hours. Inasmuch as Specific Capacity=time of discharge ("intercalation")/g, it can easily be calculated that the Specific Capacity of the graphite in this tested cell was approximately 480 mAh/g. Since the Reversible Capacity=time of charge ("de-intercalation")/g, it can further be determined that the Reversible Capacity of the graphite used in this tested cell to be approximately 250 mAh/g—well below the Known theoreticle capacity of 372 mAh/g for $LiC_6$. Accordingly, the Irreversible Capacity of approximately 230 mAh/g can likewise be calculated by subtracting the de-intercalation capacity (250 mAh/g) from the intercalation capacity (480 mAh/g).

As can further be observed from Graph No. III, through the above-identified calculations, the Reversible Capacity of the tested graphite remained below the known theoretical capacity of 372 mAh/g for $LiC_6$ after subsequent discharge and charge cycles.

Based upon the three identified experiments, as well as the physical properties of each of the samples of graphite tested (see Table I hereinabove), it becomes clear that the Reversible Capacity of graphite can be substantially increased beyond the known theoreticle capacity of 372 mAh/g for $LiC_6$ when the graphite particles used in the cell exhibit at least one of the following properties: 1) the surface area of the graphite particles is greater than 10 $m^2/g$; 2) the active surface area of the graphite particles is greater than 0.04 $m^2/g$; 3) the mean volume diameter of the graphite particles is less than 20.25 μm; and 4) the crystalline height of the graphite particles are less than 100 nm.

The foregoing description and drawings merely explain and illustrate the invention, and the invention is not limited thereto except insofar as the appended claims are so limited as those skilled in the art who have the disclosure before them will be able to make modifications and variations therein without departing from the scope of the invention.

We claim:

1. An electrolytic cell using small particle graphite comprising:

a first electrode constructed with lithium;

a second electrode constructed with graphite;

means, associated with the graphite, for increasing the reversible capacity of the graphite beyond its known theoretical capacity of 372 mAh/g for $LiC_6$; and an electrolyte associated with the first and second electrodes; the means for increasing the reversible capacity of the graphite beyond the known theoretical capacity of 372 mAh/g for $LiC_6$ comprises utilization of graphite particles on the second electrode having active surface areas greater than 0.04 $m^2/g$.

2. An electrolytic cell using small particle graphite comprising:

a first electrode constructed with lithium;

a second electrode constructed with graphite;

means, associated with the graphite, for increasing the reversible capacity of the graphite beyond its known theoretical capacity of 372 mAh/g for $LiC_6$; and an electrolyte associated with the first and second electrodes; the means for increasing the reversible capacity of the graphite beyond the known theoretical capacity of 372 mAh/g for $LiC_6$ comprises utilization of graphite particles on the second electrode having surface areas greater than 10 $m^2/g$.

3. An electrolytic cell using small particle graphite comprising:

a first electrode constructed with lithium;

a second electrode constructed with graphite;

means, associated with the graphite, for increasing the reversible capacity of the graphite beyond its known theoretical capacity of 372 mAh/g for $LiC_6$; and an electrolyte associated with the first and second electrodes; the means for increasing the reversible capacity of the graphite beyond the known theoretical capacity of 372 mAh/g for $LiC_6$ comprises utilization of graphite particles on the second electrode having mean diameters less than 20.25 micrometers.

4. An electrolytic cell using small particle graphite comprising:

a first electrode constructed with lithium;

a second electrode constructed with graphite;

means, associated with the graphite, for increasing the reversible capacity of the graphite beyond its known theoretical capacity of 372 mAh/g for $LiC_6$; and an electrolyte associated with the first and second electrodes; the means for increasing the reversible capacity o the graphite beyond the known theoretical capacity of 372 mAh/g for $LiC_6$ comprises utilization of graphite particles on the second electrode having crystalline heights less than 100 nanometers.

5. The invention according to claim 1 wherein the electrolytic cell further comprises a surface layer applied to at least one of the first and second electrodes:

the surface layer having means for enabling transfer of ions, from the electrode to which the surface layer is applied, to the electrolyte and back into contact with the electrode, and, for providing electronic conductivity in the surface layer to, in turn, result in a substantially uniform distribution of lithium metal ions back onto the electrode during electrodeposition.

6. The invention according to claim 5 wherein the electrolytic cell further comprises means for substantially obtaining chemical equilibrium between the surface layer and the electrode.

7. An electrolytic cell using small particle graphite comprising:

a first electrode constructed with a lithium source;

a second electrode constructed with graphite;

means, associated with the graphite, for maintaining the reversible capacity of the graphite, after an initial charge is applied to the electrolytic cell, and in turn, after subsequent charge and discharge cycles to the electrolytic cell, beyond 372 mAH/g; and an electrolyte associated with the first and second electrodes;

the means for maintaining the reversible capacity of the graphite after an initial charge is applied to the electrolytic cell comprises utilization of graphite particles on the second electrode having active surface areas greater than 0.04 m$^2$/g.

8. An electrolytic cell using small particle graphite comprising:

a first electrode constructed with a lithium source;

a second electrode constructed with graphite;

means, associated with the graphite, for maintaining the reversible capacity of the graphite, after an initial charge is applied to the electrolytic cell, and, in turn, after subsequent charge and discharge cycles to the electrolytic cell, beyond 372 mAH/g; and an electrolyte associated with the first and second electrodes;

the means for maintaining the reversible capacity of the graphite after an initial charge is applied to the electrolytic cell comprises utilization of graphite particles on the second electrode having surface areas greater than 10 m$^2$/g.

9. An electrolytic cell using small particle graphite comprising:

a first electrode constructed with a lithium source;

a second electrode constructed with graphite;

means, associated with the graphite, for maintaining the reversible capacity of the graphite, after an initial charge is applied to the electrolytic cell, and, in turn, after subsequent charge and discharge cycles to the electrolytic cell, beyond 372 mAH/g; and an electrolyte associated with the first and second electrodes;

the means for maintaining the reversible capacity of the graphite after an initial charge is applied to the electrolytic cell comprises utilization of graphite particles on the second electrode having mean diameters less than 20.25 micrometers.

10. An electrolytic cell using small particle graphite comprising:

a first electrode constructed with a lithium source;

a second electrode constructed with graphite;

means, associated with the graphite, for maintaining the reversible capacity of the graphite, after an initial charge is applied to the electrolytic cell, and, in turn, after subsequent charge and discharge cycles to the electrolytic cell, beyond 372 mAH/g; and an electrolyte associated with the first and second electrodes;

the means for maintaining the reversible capacity of the graphite after an initial charge is applied to the electrolytic cell comprises utilization of graphite particles on the second electrode having crystalline heights less than 100 nanometers.

11. The invention according to claim 8 wherein the electrolytic cell further comprises a surface layer applied to at least one of the first and second electrodes:

the surface layer having means for enabling transfer of ions, from the electrode to which the surface layer is applied, to the electrolyte and back into contact with the electrode, and, for providing electronic conductivity in the surface layer to, in turn, result in a substantially uniform distribution of lithium metal ions back onto the electrode during electrodeposition.

12. The invention according to claim 11 wherein the electrolytic cell further comprises means for substantially obtaining chemical equilibrium between the surface layer and the electrode.

\* \* \* \* \*

UNITED STATES PATENT AND TRADEMARK OFFICE
CERTIFICATE OF CORRECTION

PATENT NO. : 5,512,392
DATED : April 30, 1996
INVENTOR(S) : Fauteux et al.

It is certified that error appears in the above-indentified patent and that said Letters Patent is hereby corrected as shown below:

Col. 5 Graph No. 1    Delete C/S in both spaces and insert instead -- C5 --.

Col. 6 line 52    After LiC delete s and insert instead -- 6 --.

Signed and Sealed this

First Day of October, 1996

Attest:

BRUCE LEHMAN

Attesting Officer    Commissioner of Patents and Trademarks